United States Patent [19]

Silverwater et al.

[11] Patent Number: 4,813,446

[45] Date of Patent: Mar. 21, 1989

[54] AUTOMATIC PRESSURIZED RESERVOIR BLEED VALVE

[75] Inventors: Bernard F. Silverwater, Plainview; Arkady Flikop, Brooklyn, both of N.Y.

[73] Assignee: Pall Corporation, Glen Cove, N.Y.

[21] Appl. No.: 150,307

[22] Filed: Jan. 29, 1988

Related U.S. Application Data

[63] Continuation-in-part of Ser. No. 34,711, Apr. 6, 1987, abandoned.

[51] Int. Cl.⁴ .............................................. F16K 24/00

[52] U.S. Cl. .................................... 137/198; 137/199

[58] Field of Search ............... 137/197, 198, 199, 200, 137/183

[56] References Cited

U.S. PATENT DOCUMENTS

| | | | |
|---|---|---|---|
| 1,873,396 | 8/1932 | Hallenbeck . | |
| 2,362,724 | 11/1944 | Shea | 62/1 |
| 2,544,476 | 3/1951 | Venning | 277/45 |
| 2,700,303 | 1/1955 | Galliers | 73/141 |
| 2,729,228 | 1/1956 | Stevenson | 137/199 |
| 2,902,044 | 9/1959 | Sherer et al. | 137/199 |
| 2,908,282 | 10/1959 | Maisch | 137/199 |
| 3,081,788 | 3/1963 | Lewis | 137/198 |
| 4,388,047 | 6/1983 | Mizuno et al. | 417/299 |
| 4,524,793 | 6/1985 | Silverwater | 137/198 |

*Primary Examiner*—Alan Cohan
*Attorney, Agent, or Firm*—Leydig, Voit & Mayer

[57] ABSTRACT

An automatic bleed valve for bleeding air from a pressurized liquid reservoir or, with reversal of principal elements, bleeding liquid from a compressed gas reservoir comprises a piston in a piston chamber located in a flow passage leading from the reservoir. A capillary passage is provided through the piston, and the piston is urged upstream by a resilient spring. An orifice is located in the fluid channel. A sealing element is provided at the downstream end of the piston chamber. Upon activation of the hydraulic system while air is being expelled from the reservoir, the resilient spring will retain the piston in the upstream position, allowing gas to be bled from the reservoir through the fluid passage in the piston. When liquid begins to flow from the reservoir, the pressure differential over the piston increases, causing the piston to move against the downstream end of the piston chamber and seal off the fluid channel and the hydraulic reservoir.

28 Claims, 3 Drawing Sheets

AUTOMATIC PRESSURIZED RESERVOIR BLEED VALVE

TECHNICAL FIELD

The present invention is a Continuation-In-Part of U.S. patent application Ser. No. 034,711 filed 04/06/87 now abandoned and relates to bleed valves in pressurized hydraulic and pneumatic systems. Most particularly, it relates to a bleed valve for removing air from a pressurized hydraulic fluid reservoir in a hydraulic control or power distribution system.

BACKGROUND ART

Although the bleed valve of the present invention may be configured as a bleed valve for either a hydraulic or pneumatic reservoir, it will be described primarily with reference to an air bleed valve for a pressurized hydraulic reservoir. Bleed valves of various types have been placed in reservoirs and fluid return lines of hydraulic systems. Many of these valves have been large and often have been manually operated. A compact, automatic bleed valve for such systems has been described in U.S. Pat. No. 4,524,793 to Silverwater, the inventor in the present application.

A general theory of automatic bleed valve operation is explained in Silverwater '793 which utilizes a capillary and orifice placed in series in a fluid channel to cause the pressure distribution along the channel between a high pressure point at the reservoir end of the valve and a low pressure point at the discharge end of the valve to vary depending upon the phase of the fluids flowing in the channel. This theory is based upon the known fact that, in such an arrangement, a steeper pressure gradient will occur over the orifice in the case of gaseous phase flow and, conversely, a steeper gradient will be observed over the capillary portion of such a channel during liquid phase flow. The variation in the pressure distribution in the channel may be utilized to control the opening and closing of a differentiating valve, depending upon the phase of flow through the valve, as is explained in the specification of that patent. The preferred embodiment disclosed in that patent is automatic and, thus, mitigates the need for constant operator vigilance, and is relatively compact, allowing versatility in placement of the valve in the system and reducing weight, features which may be particularly important in, for example, aircraft applications. However, the valve of that embodiment is also mechanically complex. Manufacture of valves such as in the preferred embodiment of that application is complicated by the need to accurately fabricate and assemble a number of interacting mechanical parts. Multiple springs and rolling diaphragm seals are present in such valves, increasing the risks of mechanical failure. Further, such a large number of interacting parts increases the potential for complications resulting from dirt contamination of the valve.

The present invention is a different mechanism from the earlier bleed valve and provides important additional safety features, such as system shutoff. In the preferred embodiment of the previous invention, a differentiating piston operates within a bore which is located in a second, actuating piston. The actuating piston, in turn, operates within a fluid channel to begin the bleeding process when the reservoir is pressurized during start-up of the hydraulic system. Having two cooperating coaxial pistons within a single chamber complicates fabrication and assembly of the valve, increases the number of sealing members required, increases weight of the bleed valve, and complicates fabrication of the valve assembly.

DISCLOSURE OF THE INVENTION

The bleed valve of the present invention comprises a housing with a fluid channel with an inlet in communication with the reservoir as an output at lower pressure. The fluid channel includes an orifice, a check valve which allows fluid to flow only in one direction and only above a predetermined pressure, and a piston chamber containing a sliding piston. The check valve may be integrated with the piston and chamber by forming the high pressure end of the piston in such a manner as to engage a seal at the high pressure end of the cylinder to prevent the possibility of reverse flow. The piston includes a passage with a capillary portion in fluid communication with the upstream and downstream ends of the piston. A biasing means urges the piston towards the upstream end of the chamber and a sealing means seals off fluid flow in the channel when the piston is moved to the downstream end of the chamber. The inlet of the valve is connected to the reservoir at a high point where gas to be expelled will accumulate. When the hydraulic system is activated and the reservoir pressure exceeds a threshold value, the check valve allows fluid to flow from the reservoir through the channel. The gas to be expelled will first flow through the valve, producing a large pressure drop over the orifice and a small pressure drop over the capillary within the piston. When liquid begins to flow through the valve, a large pressure drop is produced over the capillary and the pressure difference causes the piston to move to the downstream end of the chamber, sealing off fluid flow through the channel.

In the present invention, a single differentiating piston with a passage including a capillary portion is utilized in series with an orifice and a conventional check valve to accomplish the bleeding process. This more simplistic and elegant approach to the bleed valve design reduces the number and complexity of moving parts and further reduces the size and weight of the valve.

It is an object of the present invention to provide a simple, easy to manufacture, more reliable, and relatively inexpensive bleed valve.

It is a further object to provide a bleed valve with a minimum of seals and moving parts, thus reducing the possibility of mechanical failure and minimizing problems which may be caused by dirt or highly viscous contaminants present in the system.

The present valve provides failsafe operation in the event of a failure of the rolling diaphragm seal located between the differentiating piston and piston chamber wall. Should fluid flow through the space between the piston and chamber wall, pressure drop over the piston will remain sufficient to close off the valve.

BEST MODE FOR CARRYING OUT THE INVENTION

Figure 1:
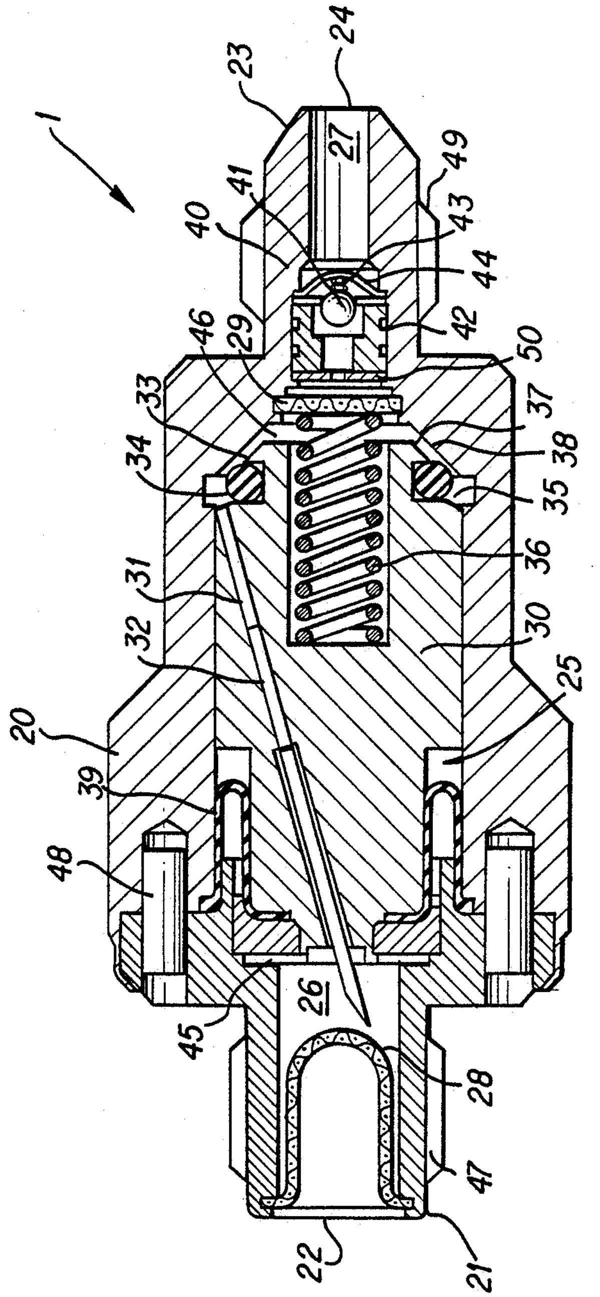
FIG. 1 is a sectional view of a bleed valve comprising an embodiment of the present invention for bleeding gas from a liquid reservoir in the open, or bleeding, position.

In accordance with the invention, a first exemplary bleed valve for a pressurized hydraulic reservoir is illustrated in FIG. 1. The exemplary preferred embodiment of the bleed valve 1 in the illustration includes a housing 20 with an upstream portion 21 having an inlet passage 26 and a downstream portion 23 having an outlet passage 27. An inlet 22 and outlet 24 are connected to an interior piston chamber 25 by the inlet passage 26 and outlet passage 27, respectively. The upstream portion 21 and downstream portion 23 of the housing 20 are formed of any suitably rigid material compatible with the fluids to be differentiated, and, in the case of the exemplary embodiment illustrated, the upstream portion 21 of the housing 20 is held in place in a recess in the downstream portion 23 of the housing 20 by swaging of the downstream portion. The angular relation of the two housing portions about longitudinal axes is fixed by the locator pins 48.

Piston 30 is slidably engaged within the chamber 25. A rolling diaphragm seal 39 provides a fluid seal between the piston 30 and the wall of the piston chamber 25, and, together with piston 30, divides chamber 25 into an upstream fluid space 45 and a downstream fluid space 46. In the exemplary embodiment, the piston chamber 25 and piston 30 are cylindrical but could be made in any convenient cross-sectional shape, for example, octagonal. A fluid passage 31 extends from the upstream end of the piston 30 to a relieved portion of the piston wall at the downstream end of the piston and includes a capillary portion 32. The relieved portion of the piston wall forms a channel portion 35 between the chamber wall and piston through which fluid can flow from passage 31 to the downstream fluid space 46. An O-ring 34 is retained in groove 33 in piston 30 at its downstream end. Piston 30 has a chamfered surface 37 at its downstream end which may cooperate with a frustoconical surface 38 at the downstream end of piston chamber 25 to seal off fluid flow when the piston 30 is moved in a downstream direction (to the right in FIG. 1). A resilient spring 36 urges the piston 30 in an upstream direction. An orifice 50 is located in the outlet passage 27. In the first exemplary embodiment, a check valve 40 is located within the outlet passage 27 downstream of orifice 50 and comprises a spherical moving element 41, seat 42, and resilient spring biasing element 43 which urges the moving element 41 against seat 42. Downstream restraining member 44 limits the downstream movement of the moving element 41 and spring 43. Seat 42 may be made of any material with a round seat sufficient to form a fluid seal against the moving element 41 and which is compatible with the fluids to be differentiated. Moving element 41 may be fabricated of any suitably rigid material, for example, stainless steel. The resilient spring 43 might be, for example, a photo-etched spring fabricated of stainless steel. An upstream filter 28 and a downstream filter 29 protect the piston chamber 25, piston 30, orifice 50, and fluid passage 31, including capillary portion 32, from dirt and other contaminants which may be contained in the fluid stream. Upstream threads 47 and downstream threads 49 facilitate attachment of the inlet 22 of the bleed valve 1 to the fluid reservoir (not shown) and attachment of the outlet 24 of the bleed valve 1 to a bleed conduit (not shown), respectively.

Check valve 40 prevents flow of fluid in the upstream direction and maintains the reservoir in a sealed condition when the hydraulic system is off. The system will remain sealed until the pressure in the reservoir reaches a threshold value determined by the stiffness of the resilient spring element 43 holding moving element 41 against seat 42. As the hydraulic system is activated and the reservoir reaches the threshold pressure, the piston 30 remains urged against the upstream end of chamber 25 by resilient spring 36. Thus, when the threshold pressure is first reached, fluid will flow into the inlet 22 through the inlet passage 26 to the upstream space 45 of chamber 25. From the upstream space 45, the fluid will flow through passage 31 in piston 30, including capillary portion 32, and then into the fluid channel portion 35 formed by the relieved portion in the wall of the piston 30, past the O-ring 34, into the downstream fluid space 46, through outlet passage 27, including orifice 50 and check valve 40, and out through the outlet 24. As long as gas, i.e., air, is flowing along this path, the pressure drop over capillary portion 32 of passage 31 is relatively small and the pressure drop over the restricting orifice 50 is relatively large. Spring 36 is selected to exert a force sufficient to retain piston 30 against the upstream portion of the chamber 25 during this flow condition. Once all gas, i.e., air, is expelled from the fluid reservoir and liquid enters the bleed valve 1, the pressure drop over the fluid passage 31 and, particularly, capillary 32, becomes relatively large and the pressure drop over the orifice 50 becomes relatively small. The strength of spring 36 is selected so that, during liquid flow, the piston 30 will move downstream in response to the higher pressure differential created between the piston ends, and O-ring 34 will engage the frustoconical surface 38, blocking the passage of fluid through the bleed valve 1. O-ring 34 will remain engaged with surface 38 until the hydraulic system is shut down and the reservoir pressure thus reduced. Spring 36 is of such strength that piston 30 will then return to the upstream end of the chamber 25 to allow the bleeding process to again occur when the hydraulic system is restarted and the reservoir repressurized.

Bleed valve 1 may be designed to incorporate a fail-safe feature. With the stiffness of spring 36 properly selected and the sliding fit of piston 30 within the chamber 25 maintained sufficiently close, should the rolling diaphragm seal 39 fail, the pressure drop created over the piston 30 during liquid flow will be sufficient to move piston 30 to the right in FIG. 1 against the urging of spring 36, and O-ring 34 will seat on frustoconical surface 38, cutting off fluid flow through the valve. Chamfer 37 and cooperating frustoconical surface 38 also may be machined sufficiently finely to minimize leakage in the event of a failure of O-ring 34. Further, either or both of their surfaces may be coated with a resilient material to perfect the seal and thus close off the fluid flow path completely when they are in contact.

Figure 2:
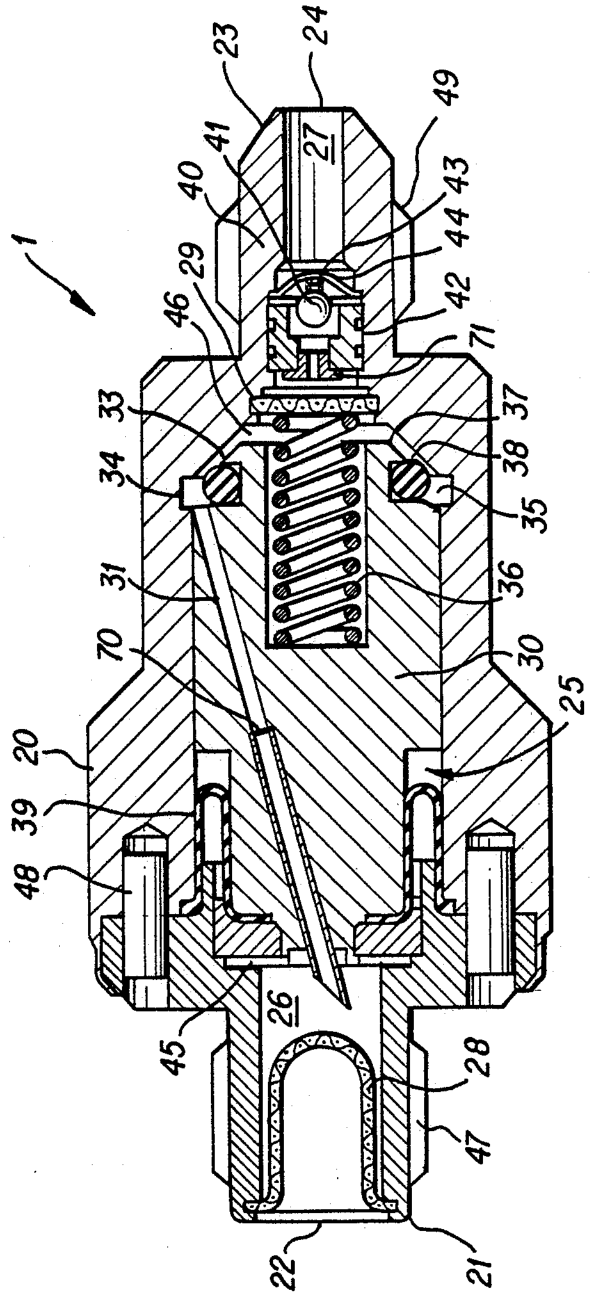
FIG. 2 is a sectional view of a bleed valve comprising a second embodiment of the present invention for bleeding liquid from a gas reservoir in the open, or bleeding, position.

In a second embodiment, the capillary 32 of passage 31 may be replaced by an orifice and a capillary may be placed in either or both of inlet passage 26 or outlet passage 27. In that configuration, the valve may be used to bleed liquid from a compressed gas reservoir. An exemplary valve with an orifice 70 located in passage 31 a capillary 71 located in outlet passage 27 is illustrated in FIG. 2. While liquid passes through the valve, the pressure differential over the orifice and, thus, over the length of the piston 30, will be relatively low. However, once gas begins to flow through the orifice in passage 31, the pressure drop over the piston 30 will become relatively high, the piston will move to the right, and the valve will close.

Figure 3:
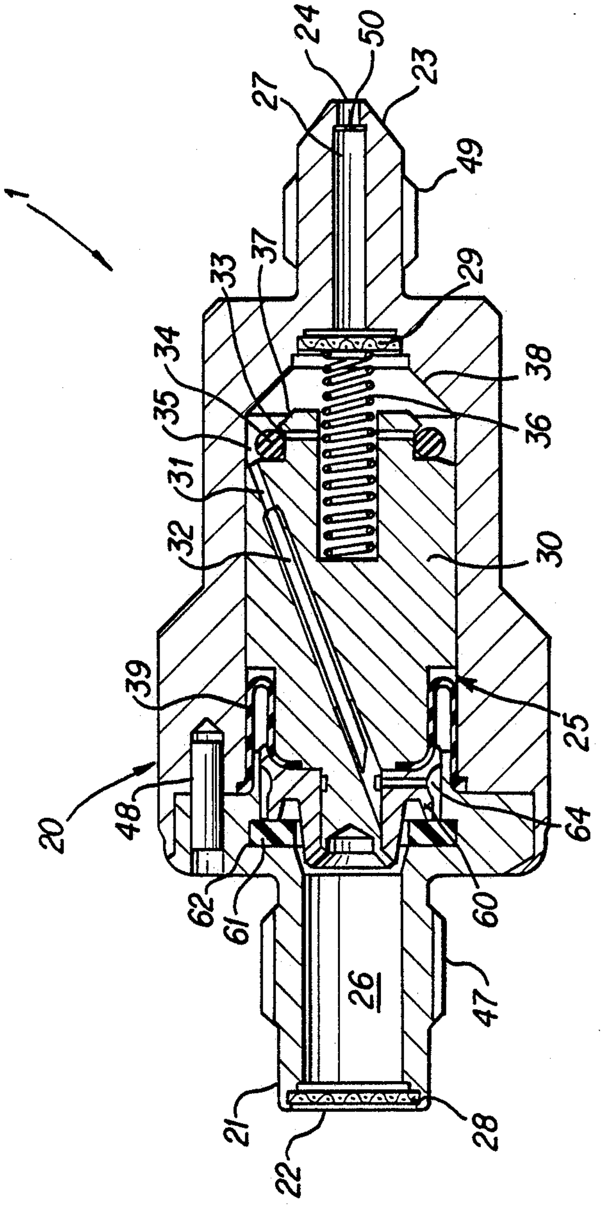
FIG. 3 is a sectional view of a bleed valve which comprises a third embodiment of the present invention in a depressurized condition.

FIG. 3 illustrates a third embodiment of the present invention in which the check valve 40 is eliminated and the upstream end of the piston 30 and the upstream end of the chamber 35 are formed in such a manner as to provide a check valve function. In this embodiment, the sliding piston 30 is formed with an annular sealing ring 60 at its upstream end. A relieved area in the wall of the piston at its end, downstream of the annular sealing ring 60, forms a portion of the fluid passage 64 communicating inlet passage 26 with the upstream end of fluid passage 31. An annular seat 61 is retained at the upstream end of chamber 25 by an annular groove 62 formed in the chamber wall so that, when the fluid pressure in the reservoir and inlet 26 falls below a predetermined threshold pressure, the piston 30, together with annular sealing ring 60, is urged in the upstream direction by spring 36. This causes the annular sealing ring 60 to engage the annular seat 61, cutting off fluid communication between inlet 26 and the fluid channel portion 64. This seals off the reservoir from the low pressure at outlets 24 and prevents drainage of the fluid from the reservoir upon shutdown of the fluid system.

While an exemplary reservoir bleed valve 1 embodying the present invention has been shown, it will be understood, of course, that the invention is not limited to that embodiment. Modification may be made by those skilled in the art, particularly in light of the foregoing teachings. For example, rather than providing cooperating surfaces on the downstream end of the piston and piston chamber to seal off the fluid flow, movement of the piston might instead be utilized, through mechanical or electrical means, to open and close a valve at a point in the hydraulic system remote from the housing 20. The check valve might be designed to provide an orifice effect. It is, therefore, contemplated by the appended claims to cover any such modifications which incorporate the essential features of this invention or encompass the true spirit and scope of the invention.

We claim:

1. An automatic bleed valve for a pressurized fluid reservoir comprising:
- a housing enclosing a fluid channel with an inlet at a first end in fluid communication with said reservoir and an outlet at a second end at a lower pressure than said reservoir;
- a restricting orifice within said fluid channel;
- a check valve within said fluid channel to allow fluid to flow in the channel only in a direction away from said reservoir and only when pressure of the reservoir exceeds the lower pressure by an amount greater than a predetermined amount;
- a piston chamber within said fluid channel having interior walls, an axis, and upstream and downstream ends;
- a piston contained within said chamber with an exterior wall in slidable contact with the walls of said chamber and an axis coinciding with the axis of said chamber, said piston having an upstream end, a downstream end, and a capillary passage providing fluid communication between the upstream end and the downstream end;
- a biasing means to urge said piston towards the upstream end of said chamber; and
- a sealing means to seal off fluid flow through the channel when the piston is moved toward the downstream end of said chamber in response to a predetermined minimum pressure differential between the upstream and downstream ends of said piston.

2. A bleed valve according to claim 1 in which said sealing means comprises a resilient material at the downstream end of the chamber which seals against the downstream end of the piston when the piston is moved in the downstream direction.

3. A bleed valve according to claim 1 in which said sealing means comprises a resilient material at the downstream end of the piston which seals against the downstream end of the piston chamber when the piston is moved in the downstream direction.

4. A bleed valve according to claim 1 in which the wall of the piston is relieved from the wall of said chamber to form a fluid channel portion between said piston wall and said chamber wall over a downstream portion of said piston and the capillary passage extends from the upstream end of said piston to a point at the relieved wall of the piston so that said channel portion completes fluid communication of the capillary between the upstream and downstream ends of the piston, said piston has a chamfer surface at its downstream end, and said chamber has a frustoconical surface parallel to and cooperating with said chamfer surface to seal off fluid flow past the downstream end of said piston when said piston is moved against the downstream end of said chamber.

5. A bleed valve according to claim 4 in which said piston further comprises a groove containing an O-ring to cooperate with said cooperating surface of the chamber.

6. A bleed valve according to claim 4 in which the check valve is located downstream of the chamber.

7. A bleed valve according to claim 6 in which the restricting orifice is located downstream of the chamber.

8. A bleed valve according to claim 7 in which said check valve includes a movable member, a seat for cooperating with said movable member to seal off fluid flow through the channel, a restraining member for preventing the movable member from traveling beyond a given point downstream, and a means for urging the movable member against said seat with a predetermined force so that said movable member will be held against said seat and no fluid will flow through said channel so long as the reservoir pressure does not exceed the lower pressure by a predetermined amount.

9. A bleed valve according to claim 8 in which said seat comprises said restricting orifice.

10. A bleed valve according to claim 8 in which said restraining member comprises said restricting orifice.

11. An automatic bleed valve for a pressurized fluid reservoir comprising:
- a housing having a cylindrical piston chamber with an upstream end connected to an inlet passage and a downstream end connected to an outlet passage;
- a cylindrical piston located within the piston chamber with a longitudinal wall in slidable contact with a wall of the chamber and dividing the chamber into an upstream fluid space and a downstream fluid space;

a fluid passage providing fluid communication between the upstream fluid space and the downstream fluid space including a capillary portion;

means for urging the piston in an upstream direction with a predetermined force;

an orifice portion located in the outlet passage;

a check valve located in the outlet passage allowing fluid to flow through the outlet passage only in one direction and only in response to a reservoir pressure greater than a predetermined pressure;

a chamfer surface at the downstream end of said piston and a cooperating frustoconical surface on the downstream end of said piston chamber so that when the downstream end of the piston is moved into contact with the downstream end of the piston chamber, the chamfer and frustoconical surface come into contact whereby fluid is prevented from flowing from the fluid passage to the outlet.

12. A bleed valve according to claim 11 in which said fluid passage includes a channel portion, said capillary portion formed within the piston and said channel portion bounded by the chamber wall and a portion of the piston wall relieved from contact with the chamber wall.

13. A bleed valve according to claim 12 in which a seal is provided between the piston wall and chamber wall by a rolling diaphragm seal.

14. A bleed valve according to claim 11 in which the piston includes an O-ring groove and an O-ring retained in said groove to seal against the cooperating frustoconical surface of the piston chamber.

15. A bleed valve according to claim 11 in which the piston includes an O-ring groove and an O-ring retained in said groove to seal against the cooperating frustoconical surface of the piston chamber.

16. An automatic bleed valve for a pressurized fluid reservoir comprising:

a housing having a cylindrical piston chamber with an upstream end connected to an inlet passage and a downstream end connected to an outlet passage;

a cylindrical piston located within the piston chamber with a longitudinal wall in slidable contact with a wall of the chamber and dividing the chamber into an upstream fluid space and a downstream fluid space;

a fluid passage providing fluid communication between the upstream fluid space and the downstream fluid space including an orifice portion;

means for urging the piston in an upstream direction with a predetermined force;

a capillary portion located in the outlet passage;

a check valve located in the outlet passage allowing fluid to flow through the outlet passage only in one direction and only in response to a reservoir pressure greater than a predetermined pressure; and a chamfer surface at the downstream end of said piston and a cooperating frustoconical surface on the downstream end of said piston chamber so that when the downstream end of the piston is moved into contact with the downstream end of the piston chamber, the chamfer and frustoconical surface come into contact whereby fluid is prevented from flowing from the fluid passage to the outlet.

17. An automatic bleed valve for a pressurized fluid reservoir comprising:

a housing enclosing a fluid channel with an inlet at a first end in fluid communication with said reservoir and an outlet at a second end at a lower pressure than said reservoir;

a restricting orifice within said fluid channel;

a piston chamber within said fluid channel having interior walls, an axis, and upstream and downstream ends;

a piston contained within said chamber with an exterior wall in slidable contact with the walls of said chamber and an axis coinciding with the axis of said chamber, said piston having an upstream end, a downstream end, and a capillary passage providing fluid communication between the upstream end and the downstream end;

a biasing means to urge said piston towards the upstream end of said chamber;

a first sealing means to seal off fluid flow through the channel when the piston is moved toward the downstream end of said chamber in response to a predetermined minimum pressure differential between the upstream and downstream end of said piston; and a second sealing means to seal off fluid flow through the channel when the piston is moved upstream by said biasing means in response to a pressure differential less than a predetermined maximum pressure differential between the upstream and downstream ends of said piston.

18. A bleed valve according to claim 17 in which said second sealing means comprises a resilient material at the upstream end of the chamber which seals against the upstream end of the piston when the piston is moved in the upstream direction.

19. A bleed valve according to claim 17 in which said sealing means comprises a resilient material at the upstream end of the piston which seals against the upstream end of the piston chamber when the piston is moved in the upstream direction.

20. A bleed valve according to claim 17 in which the wall of the piston is relieved from the wall of said chamber to form an upstream fluid channel portion between said piston wall and said chamber wall over an upstream portion of said piston and the capillary passage extends to the downstream end of said piston from a point at the relieved wall of the piston so that said upstream channel portion completes fluid communication of the capillary between the upstream and downstream ends of the piston, said piston has an annular sealing surface at its upstream end, and said chamber has a seating surface to cooperate with said annular sealing surface to seal off fluid flow past the upstream end of said piston when said piston is moved against the upstream end of said chamber.

21. A bleed valve according to claim 20 in which said chamber further comprises a groove containing an annular seal to cooperate with said cooperating surface of the piston.

22. A bleed valve according to claim 21 in which the restricting orifice is located downstream of the chamber.

23. An automatic bleed valve for a pressurized fluid reservoir comprising:

a housing having a cylindrical piston chamber with an upstream end connected to an inlet passage and a downstream end connected to an outlet passage;

a cylindrical piston located within the piston chamber with a longitudinal wall in slidable contact with a wall of the chamber and dividing the chamber into an upstream fluid space and a downstream fluid space;

a fluid passage providing fluid communication between the upstream fluid space and the downstream fluid space including a capillary portion;

means for urging the piston in an upstream direction with a predetermined force;

an orifice portion located in the outlet passage;

a chamfer surface at the downstream end of said piston and a cooperating frustoconical surface on the downstream end of said piston chamber so that when the downstream end of the piston is moved into contact with the downstream end of the piston chamber, the chamfer and frustoconical surface come into contact whereby fluid is prevented from flowing from the fluid passage to the outlet; and an annular seal at the upstream end of said piston and a cooperating seat on the upstream end of said chamber so that, when the seal is moved into contact with the upstream end of the chamber, fluid is prevented from flowing from the outlet to the fluid passage.

24. A bleed valve according to claim 23 in which said fluid passage includes a channel portion, said capillary portion formed within the piston and said channel portion bounded by the chamber wall and a portion of the piston wall relieved from contact with the chamber wall.

25. A bleed valve according to claim 24 in which a seal is provided between the piston wall and chamber wall by a rolling diaphragm seal.

26. A bleed valve according to claim 25 in which a seal is provided between the piston wall and chamber wall by a rolling diaphragm seal.

27. An automatic bleed valve for a pressurized fluid reservoir comprising:

a housing having a cylindrical piston chamber with an upstream end connected to an inlet passage and a downstream end connected to an outlet passage;

a cylindrical piston located within the piston chamber with a longitudinal wall in slidable contact with a wall of the chamber and dividing the chamber into an upstream fluid space and a downstream fluid space;

a fluid passage providing fluid communication between the upstream fluid space and the downstream fluid space including an orifice portion;

means for urging the piston in an upstream direction with a predetermined force;

a capillary portion located in the outlet passage;

a chamfer surface at the downstream end of said piston and a cooperating frustoconical surface on the downstream end of said piston chamber so that when the downstream end of the piston is moved into contact with the downstream end of the piston chamber, the chamfer and frustoconical surface come into contact whereby fluid is prevented from flowing from the fluid passage to the outlet; and an annular seal at the upstream end of said piston and a cooperating seat on the upstream end of said chamber so that, when the seal is moved into contact with the upstream end of the chamber, fluid is prevented from flowing from the outlet to the fluid passage.

28. An automatic bleed valve for a pressurized fluid reservoir comprising:

a housing having a cylindrical piston chamber with an upstream end connected to an inlet passage and a downstream end connected to an outlet passage;

a cylindrical piston located within the piston chamber with a longitudinal wall in slidable contact with a wall of the chamber and dividing the chamber into an upstream fluid space and a downstream fluid space;

a fluid passage providing fluid communication between the upstream fluid space and the downstream fluid space including an orifice portion;

means for urging the piston in an upstream direction with a predetermined force;

a capillary portion located in the outlet passage;

a check valve located in the outlet passage allowing fluid to flow through the outlet passage only in one direction and only in reservoir pressure greater than a predetermined pressure; and a chamfer surface at the downstream end of said piston and a cooperating frustoconical surface on the downstream end of said piston chamber so that when the downstream end of the piston is moved into contact with the downstream end of the piston chamber, the chamfer and frustoconical surface come into contact whereby fluid is prevented from flowing from the fluid passage to the outlet.

* * * * *

UNITED STATES PATENT AND TRADEMARK OFFICE

CERTIFICATE OF CORRECTION

PATENT NO. : 4,813,446

DATED : March 21, 1989

INVENTOR(S) : Silverwater et al

It is certified that error appears in the above-identified patent and that said Letters Patent is hereby corrected as shown below:

In Column 7, line 29, change "11" to --12--.

Signed and Sealed this

Twenty-seventh Day of August, 1991

*Attest:*

HARRY F. MANBECK, JR.

*Attesting Officer*

*Commissioner of Patents and Trademarks*